United States Patent
Hiraiwa et al.

(10) Patent No.: US 9,876,248 B2
(45) Date of Patent: *Jan. 23, 2018

(54) SOLID ELECTROLYTE, METHOD FOR MANUFACTURING SOLID ELECTROLYTE, SOLID ELECTROLYTE LAMINATE, METHOD FOR MANUFACTURING SOLID ELECTROLYTE LAMINATE, AND FUEL CELL

(71) Applicants: Sumitomo Electric Industries, Ltd., Osaka-shi, Osaka (JP); Kyoto University, Kyoto-shi, Kyoto (JP)

(72) Inventors: Chihiro Hiraiwa, Itami (JP); Masatoshi Majima, Itami (JP); Atsushi Yamaguchi, Itami (JP); Naho Mizuhara, Itami (JP); Tetsuya Uda, Kyoto (JP); Donglin Han, Kyoto (JP); Akiko Kuramitsu, Kyoto (JP)

(73) Assignees: SUMITOMO ELECTIC INDUSTRIES, LTD., Osaka-shi, Osaka (JP); KYOTO UNIVERSITY, Kyoto-shi, Kyoto (JP)

( * ) Notice: Subject to any disclaimer, the term of this patent is extended or adjusted under 35 U.S.C. 154(b) by 128 days.

This patent is subject to a terminal disclaimer.

(21) Appl. No.: 14/387,639

(22) PCT Filed: Mar. 26, 2013

(86) PCT No.: PCT/JP2013/058744
§ 371 (c)(1),
(2) Date: Sep. 24, 2014

(87) PCT Pub. No.: WO2013/146765
PCT Pub. Date: Oct. 3, 2013

(65) Prior Publication Data
US 2015/0044597 A1    Feb. 12, 2015

(30) Foreign Application Priority Data

Mar. 28, 2012 (JP) ................................. 2012-074254

(51) Int. Cl.
*H01M 8/12* (2016.01)
*C04B 35/48* (2006.01)
(Continued)

(52) U.S. Cl.
CPC ............... *H01M 8/12* (2013.01); *C04B 35/48* (2013.01); *C04B 35/486* (2013.01);
(Continued)

(58) Field of Classification Search
CPC ... C04B 35/48; C04B 35/486; C04B 35/6261; C04B 2235/3215; C04B 2235/3225;
(Continued)

(56) References Cited

U.S. PATENT DOCUMENTS

2004/0023101 A1    2/2004   Jacobson et al.
2006/0251950 A1   11/2006   Prinz et al.
(Continued)

FOREIGN PATENT DOCUMENTS

CN    101037331 A    9/2007
CN    101496201 A    7/2009
(Continued)

OTHER PUBLICATIONS

Emiliana Fabbri "Design and fabrication of a chemically-stable proton conductor bilayer electrolyte for intermediate temperature solid oxide fuel cells (IT-SOFCs)" Energy Environ. Sci., Jun. 1, 2008, 355-359.*

(Continued)

*Primary Examiner* — Devina Pillay
(74) *Attorney, Agent, or Firm* — Drinker Biddle & Reath LLP

(57) ABSTRACT

Provided is a solid electrolyte made of yttrium-doped barium zirconate having hydrogen ion conductivity, a doped amount of yttrium being 15 mol % to 20 mol %, and a rate of increase in lattice constant at 100° C. to 1000° C. with respect to temperature changes being substantially constant. Also provided is a method for manufacturing the solid electrolyte. This solid electrolyte can be formed as a thin film, and a solid electrolyte laminate can be obtained by laminating electrode layers on this solid electrolyte. This solid electrolyte can be applied to an intermediate temperature operating fuel cell.

11 Claims, 7 Drawing Sheets

(51) Int. Cl.
| | |
|---|---|
| H01B 1/12 | (2006.01) |
| H01M 8/1253 | (2016.01) |
| H01M 4/88 | (2006.01) |
| C04B 35/486 | (2006.01) |
| C04B 35/626 | (2006.01) |
| H01M 8/124 | (2016.01) |

(52) U.S. Cl.
CPC ......... *C04B 35/6261* (2013.01); *H01B 1/122* (2013.01); *H01M 4/8889* (2013.01); *H01M 4/8896* (2013.01); *H01M 8/1253* (2013.01); C04B 2235/3215 (2013.01); C04B 2235/3225 (2013.01); C04B 2235/661 (2013.01); C04B 2235/761 (2013.01); C04B 2235/786 (2013.01); C04B 2235/9607 (2013.01); H01M 2008/1293 (2013.01); H01M 2300/0077 (2013.01); Y02E 60/525 (2013.01); Y02P 70/56 (2015.11)

(58) Field of Classification Search
CPC ........ C04B 2235/661; C04B 2235/761; C04B 2235/786; C04B 2235/9607; H01M 8/1253; H01M 4/8889; H01M 4/8896; H01M 8/12; H01M 2008/1293; H01M 2300/0077; H01B 1/122; Y02E 60/521; Y02E 60/525; Y02P 70/56
See application file for complete search history.

(56) References Cited

U.S. PATENT DOCUMENTS

| | | |
|---|---|---|
| 2009/0233151 A1 | 9/2009 | Iijima |
| 2011/0262839 A1 | 10/2011 | Kang et al. |
| 2015/0044596 A1 | 2/2015 | Hiraiwa et al. |

FOREIGN PATENT DOCUMENTS

| | | |
|---|---|---|
| CN | 2011-213588 A | 10/2011 |
| JP | 2001-307546 A | 11/2001 |
| JP | 2007-317627 A | 12/2007 |
| JP | 2008-053194 A | 3/2008 |
| JP | 2012-170833 A | 9/2012 |
| WO | WO 03/096470 A1 | 11/2003 |

OTHER PUBLICATIONS

Tong "Cost-effective solid-state reactive sintering method for high conductivity proton conducting yttrium-doped barium zirconium ceramics", Solid State Ionics, vol. 181, Issues 11-12, Apr. 29, 2010, pp. 496-503.*

Yamazaki "High Total Proton Conductivity in Large-Grained Yttrium-Doped Barium Zirconate", May 2009, Chem. Mater., 2009, 21 (13), pp. 2755-2762.*

Emiliana Fabbri, et al., "A novel single chamber solid oxide fuel cell based on chemically stable thin films of Y-doped BaZrO3 proton conducting electrolyte," Energy & Environmental Science, Apr. 1, 2010, vol. 3, No. 5, pp. 618-621.

Donglin Han, et al., "Relationship between Phase Equilibrium and Thermal History of Y-doped BaZrO3," Shizai Sozai, Sep. 26, 2011 (Sep. 26, 2011), vol. 2011, No. 2, pp. 113-114, including Partial English Translation.

Fumitada Iguchi, et al., "Relationship between Residual Stress and Electrical Properties in Solid Electrolyte Thin Films," The Japan Society of Mechanical Engineers Nenji Taikai Koen Ronbunshu, Sep. 12, 2009 (Sep. 12, 2012), vol. 1, pp. 229-230.

Yoshihiro Yamazaki, et al., "High Total Proton Conductivity in Large-Grained Yttrium-Doped Barium Zirconate," Chemistry of Materials, May 20, 2009, vol. 21, No. 13, pp. 2755-2762.

Pergolesi, Daniele, et al., "Chemically stable anode-supported solid oxide fuel cells based on Y-doped barium zirconate thin films having improved performance," Electrochemistry Communications, 2010, pp. 977-980.

Tong J. et al., "Cost-effective solid-state reactive sintering method for high conductivity proton conducting yttrium-doped barium zirconium ceramics", vol. 181, No. 11-12, Apr. 29, 2010, pp. 496-503.

Yamazaki et al., "Cation non-stoichiometry in yttrium-doped barium zirconate: phase behavior, microstructure, and proton conductivity", vol. 20, No. 37, Jan. 1, 2010, pp. 8158-8166.

Imashuku et al., "Sintering Properties of Trivalent Cation-Doped Barium Zirconate at 1600°C", vol. 10, No. 10, Jan. 1, 2007, pp. B175-B178.

D'Epifanio et al., "Design of $BaZr_{0.8}Y_{0.2}O_{3-[delta]}$ Protonic Conductor to Improve the Electrochemical Performance in Intermediate Temperature Solid Oxide Fuel Cells (IT-SOFCs)", vol. 8, No. 1, Feb. 1, 2008, pp. 69-76.

Hiraiwa et al., "Chemical Expansion and Change in Lattice Constant of Y-Doped $BaZrO_3$" by Hydration/Dehydration Reaction and Final Heat-Treating Temperature, vol. 96, No. 3, Mar. 12, 2013, pp. 879-884.

Donglin Han et al., "A comprehensive understanding of structure and site occupancy of Y in Y-doped $BaZrO_3$", vol. 1, No. 9, Jan. 1, 2013, pp. 3027-3033.

U.S. Office Action dated Dec. 28, 2016 that issued in U.S. Appl. No. 14/387,635 including Double Patenting Rejections on pp. 9-11.

* cited by examiner

SOLID ELECTROLYTE, METHOD FOR MANUFACTURING SOLID ELECTROLYTE, SOLID ELECTROLYTE LAMINATE, METHOD FOR MANUFACTURING SOLID ELECTROLYTE LAMINATE, AND FUEL CELL

TECHNICAL FIELD

The invention of the present application relates to a solid electrolyte, a method for manufacturing a solid electrolyte, and the like. Specifically, the invention relates to a solid electrolyte that operates in an intermediate temperature range less than or equal to 600° C. and can be easily manufactured, a method for manufacturing the solid electrolyte, and the like.

BACKGROUND ART

A solid oxide fuel cell (hereinafter referred to as "SOFC") is highly efficient 1.5 and does not require an expensive catalyst such as platinum. On the other hand, since its operating temperature is as high as 800° C. to 1000° C., a problem arises in that a structural material such as an interconnector is likely to be degraded.

To solve the above-described problem, an intermediate temperature operating SOFC having a lowered operating temperature less than or equal to 600° C. has been expected. At low operating temperatures, however, efficiency is decreased, so that predetermined power generation performance cannot be ensured disadvantageously. Therefore, a solid electrolyte exhibiting high efficiency even at low operating temperatures and being capable of ensuring predetermined power generation performance has been required.

As a solid electrolyte, one having oxygen ion conductivity or proton conductivity is employed. In the case of employing a solid electrolyte having oxygen ion conductivity, the oxygen ion is bonded to hydrogen to produce water at a fuel electrode. This water dilutes fuel to decrease efficiency disadvantageously.

On the other hand, a solid electrolyte having proton conductivity such as yttrium-doped barium zirconate (hereinafter referred to as "BZY") can achieve high proton conductivity at low temperatures since activation energy for charge transfer is low, and is expected as a solid electrolyte material as an alternative to the above-described solid electrolyte having oxygen ion conductivity. In the case of employing the solid electrolyte having proton conductivity, the above-described problem encountered in the solid electrolyte having oxygen ion conductivity does not occur.

CITATION LIST

Patent Document

PTD 1: Japanese Patent Laying-Open No. 2001-307546

SUMMARY OF INVENTION

Technical Problem

The above-described BZY has excellent chemical stability, but is disadvantageous in that sinterability is poor as a polycrystalline material and in that the ratio of grain boundary is large because of its small crystal grains, which inhibits proton conductivity and decreases the total electric conductivity. Therefore, the above-described BZY has not been effectively utilized so far.

In particular, if the doped amount of yttrium is less than or equal to 10 mol %, crystal grains are difficult to grow at the time of sintering. Thus, the grain boundary surface density increases to increase the resistance. If this is utilized for a fuel cell, power generation performance will be decreased.

On the other hand, if more than or equal to 15 mol % of yttrium is doped, it will be difficult to uniformly dissolve yttrium in a dispersed manner. Therefore, in the temperature range of 200° C. to 400° C., a phenomenon will occur in which relaxation of a non-equilibrium phase occurs to change the coefficient of thermal expansion.

FIG. 4 shows changes in lattice constant of solid electrolytes having different amounts of yttrium doped, with respect to temperature changes. As shown in this drawing, in the case where yttrium is not doped, the rate of change in lattice constant with respect to temperature changes is substantially constant, and the lattice constant increases as a linear function along a linear graph having a predetermined gradient. On the other hand, as the doped amount of yttrium is increased, the lattice constant with respect to an identical temperature increases at a certain ratio, and in a temperature range around 400° C., a region appears in which the lattice constant greatly increases in value deviating from the vicinity of the straight line of the linear function. The above-described region where the lattice constant greatly increases appears when the doped amount of yttrium exceeds 15 mol %, and becomes remarkable at 20 mol %. This is presumed because relaxation of the non-equilibrium phase has occurred in the above-described temperature area.

It is noted that the above-described lattice constant is calculated by the Rietveld analysis from a high-temperature XRD measurement result.

Since the lattice constant represents the length of each side of unit lattice of crystal, the coefficient of thermal expansion will change in accordance with the above-described changes in lattice constant. That is, when the doped amount of yttrium is increased, the coefficient of thermal expansion greatly changes in the region around 400° C. In the case of using the above-described solid electrolyte for a fuel cell, electrode layers are laminated on the both sides of a thin-film solid electrolyte layer. The materials constituting the above-described electrode layers have substantially constant coefficients of thermal expansion, and thermally expand in proportion to the temperature. Therefore, in the case of employing a solid electrolyte having a large doped amount of yttrium, large shearing force is produced around 400° C. at the interface in a laminate formed by laminating the above-described solid electrolyte and the above-described electrode materials, raising problems in that cracks occur in the solid electrolyte layer and the electrode layers are detached. As a result, yields in the manufacturing process and durability of fuel cell cannot be ensured disadvantageously.

The invention of the present application was devised to solve the above-described problems, and has an object to provide a solid electrolyte made of yttrium-doped barium zirconate in which the above-described changes in coefficient of thermal expansion do not occur even when the doped amount of yttrium is increased, a method for manufacturing the same, and the like.

Solution to Problem

The invention defined in claim 1 of the present application relates to a solid electrolyte made of yttrium-doped barium zirconate having hydrogen ion conductivity, the above-described doped amount of yttrium being 15 mol % to 20 mol % (more than or equal to 15 mol % and less than or equal to 20 mol %), and a rate of increase in lattice constant of the above-described solid electrolyte at 100° C. to 1000° C. (more than or equal to 100° C. and less than or equal to 1000° C.) with respect to temperature changes being substantially constant.

In the invention of the present application, the doped amount of yttrium is set at 15 mol % to 20 mol %. Accordingly, high proton conductivity can be ensured, and sinterability can be improved.

If the above-described doped amount of yttrium is less than 15 mol %, changes in coefficient of thermal expansion will be relatively small, so that the problem due to thermal expansion will be less likely to occur. However, in order to improve sinterability and ensure proton conductivity in the above-described intermediate temperature range, it is preferable to set the doped amount of yttrium at more than or equal to 15 mol %. On the other hand, if the above-described doped amount of yttrium exceeds 20 mol %, it will be difficult to uniformly blend yttrium in a dispersed manner, and ion conductivity will be decreased.

In the solid electrolyte according to the invention of the present application, the rate of increase in lattice constant at 100° C. to 1000° C. with respect to temperature changes is substantially constant. That is, relaxation of the non-equilibrium phase does not occur in the above-described temperature range, and the coefficient of thermal expansion is held substantially constant. Therefore, in the step of laminating electrode layers and the like, occurrence of cracks that would be caused by changes in coefficient of thermal expansion can be prevented, and the electrode layers are unlikely to be detached. Herein, the expression "substantially constant" means that, when plotting the lattice constant with respect to the temperature in the temperature range more than or equal to 100° C. and less than or equal to 1000° C. to create a scatter plot, the lattice constant increases as a linear function and does not exhibit specific changes around 400° C.

The rate of increase in lattice constant of the above-described solid electrolyte at 100° C. to 1000° C. with respect to temperature changes is preferably set at $3.3 \times 10^{-5}$ Å/° C. to $4.3 \times 10^{-5}$ Å/° C. (more than or equal to $3.3 \times 10^{-5}$ Å/° C. and less than or equal to $4.3 \times 10^{-5}$ Å/° C.). By setting the rate of increase in lattice constant at the above-described range, it becomes possible to set the coefficient of thermal expansion at a predetermined range. It is more preferable to set the above-described rate of increase in lattice constant such that the average coefficient of thermal expansion at 100° C. to 1000° C. becomes $5 \times 10^{-6}$ (1/K) to $9.8 \times 10^{-6}$ (1/K) (more than or equal to $5 \times 10^{-6}$ (1/K) and less than or equal to $9.8 \times 10^{-6}$ (1/K)).

The sintering temperature after molding the solid electrolyte according to the invention of the present application as a thin film and laminating electrode materials on this thin-film solid electrolyte is approximately 1000° C. Therefore, by setting the lattice constant at 100° C. to 1000° C. at the above-described values, a great difference in thermal expansion amount between the solid electrolyte layer and the electrode layers will not occur in the step of sintering the electrode layers, which can effectively prevent cracks and detachment from occurring.

According to the invention defined in claim 3, the mean diameter of crystal grains of the above-described solid electrolyte is set at more than or equal to 1 μm.

As described above, when the mean diameter of crystal grains of the solid electrolyte is decreased, the grain boundary surface density increases to increase the resistance, and proton conductivity is reduced. By setting the mean diameter of crystal grains at more than or equal to 1 μm, the above-described problems can be avoided. It is noted that the mean diameter of crystal grains is preferably less than or equal to 30 μm from the viewpoint of film thickness. Herein, the mean diameter of crystal grains refers to an arithmetic mean value of an equivalent diameter of a circle that has the same area as the projected area measured for 100 crystal grains in an observation visual field when monitoring a surface (or a cross section) of a solid electrolyte as a compact by electron microscope under a magnification of ×1000 to ×5000.

Preferably, the lattice constant of the solid electrolyte at room temperature (30° C.) is set at 4.190 Å to 4.230 Å (more than or equal to 4.190 Å and less than or equal to 4.230 Å), and more preferably set at 4.218 Å to 4.223 Å (more than or equal to 4.218 Å and less than or equal to 4.223 Å) as the invention defined in claim 4.

The lattice constant at room temperature is correlated with the doped amount of yttrium and the change in lattice constant around 400° C. Therefore, by setting the lattice constant at room temperature at the above-described range, the lattice constant around 400° C. can be estimated to grasp the coefficient of thermal expansion of the solid electrolyte. Moreover, when sintering the laminated electrode layers, detachment and the like can be prevented.

Preferably, proton conductivity of the solid electrolyte at 400° C. to 800° C. (more than or equal to 400° C. and less than or equal to 800° C.) is set at 1 mS/cm to 60 mS/cm (more than or equal to 1 mS/cm and less than or equal to 60 mS/cm). Since the above-described proton conductivity can be ensured in the above-described temperature range, it becomes possible to ensure required power generation performance in an intermediate temperature range when implementing a fuel cell.

The form of a solid electrolyte laminate formed through use of the solid electrolyte according to the invention of the present application is not particularly limited. By laminating electrode layers on the both sides of a solid electrolyte layer formed from the above-described solid electrolyte, a solid electrolyte laminate that can be used in an intermediate temperature range can be formed.

The above-described solid electrolyte laminate is manufactured by a manufacturing method including the following steps. For example, a first grinding step of mixing and grinding $BaCO_3$, $ZrO_2$ and $Y_2O_3$, a first heat treatment step of heat treating a mixture (first mixture) having undergone the above-described grinding at a predetermined temperature for a predetermined time, a second grinding step of grinding the mixture (first mixture) having undergone the above-described first heat treatment step again, a first compression molding step of compression molding the mixture (second mixture) having undergone the above-described second grinding step, a second heat treatment step of heat treating a compact (first compact) having undergone the above-described compression molding at a predetermined temperature, a third grinding step of grinding the compact (first compact) having undergone the above-described second heat treatment step, a second compression molding step of compression molding a ground product having undergone the above-described third grinding step, a solid electrolyte sintering step of heat treating a compact (second compact) molded by the above-described second compression molding step at a temperature of 1400° C. to 1600° C. (more than or equal to 1400° C. and less than or equal to 1600° C.) for at least 20 hours in an oxygen atmosphere, and a third heat treatment step of holding a sintered compact having undergone the above-described solid electrolyte sintering step at a temperature lower than in the above-described solid electrolyte sintering step for a predetermined time can be included.

The blending amount of above-described $BaCO_3$, $ZrO_2$ and $Y_2O_3$ is not particularly limited as long as the doped amount of yttrium ranges from 15 mol % to 20 mol %. For example, when the doped amount of yttrium is 15 mol %, a material containing 62 wt % of $BaCO_3$, 33 wt % of $ZrO_2$ and 5 wt % of $Y_2O_3$ mixed therein can be employed.

In the invention of the present application, a solid electrolyte sintered compact is formed by a solid phase reaction method. The technique for carrying out the above-described grinding steps is not particularly limited. For example, the grinding steps can be carried out by already-known ball milling. For example, as the first grinding step and the second grinding step, ball milling can be carried out for about 24 hours. Although the ground grain size after the above-described grinding steps is not particularly limited, grinding is preferably performed such that the mean particle diameter is less than or equal to 355 μm.

The above-described first heat treatment step can be carried out by, for example, holding at 1000° C. for about 10 hours in an atmosphere, and the above-described second heat treatment step can be carried out by holding at 1300° C. for about 10 hours in an atmosphere.

The technique for carrying out the above-described compression molding steps is also not particularly limited. For example, a ground material can be molded uniaxially to form a predetermined compact. The above-described compression molding steps are to uniformly mix the respective blended components in a dispersed manner. As long as grinding can be performed easily, the form of compact is not particularly limited. For example, a cylindrical die having a diameter of 20 mm is used, and a compressive force of 10 MPa is applied in the axial direction to form a disc-like compact.

By heat treating the above-described compact at about 1300° C. for about 10 hours, each component powder can be dissolved to form a material in which the above-described respective components have been uniformly dispersed. Thereafter, the third grinding step of grinding the compact having undergone the above-described second heat treatment step is carried out. To uniformly mix the above-described respective component powders in a dispersed manner, it is desirable to repeatedly carry out the above-described third grinding step, the above-described compression molding step and the second heat treatment step in this order. Accordingly, a material in which the respective components have been uniformly dissolved in a dispersed manner can be formed. Whether the above-described respective component powders have been uniformly dispersed can be confirmed with an X-ray diffractometer (XRD).

Next, a second compression molding step of compression molding the ground product having undergone the above-described third grinding step is carried out. The second compression molding step can be carried out by adding a binder such as ethyl cellulose and compression molding the above-described ground product. The above-described second compression molding step is to mold the above-described ground product into the form of a solid electrolyte layer, and for example, the product can be molded into a disc having predetermined thickness.

Next, by carrying out the sintering step of heat treating the above-described compact at a temperature of 1400° C. to 1600° C. for at least 20 hours in an oxygen atmosphere, a solid electrolyte sintered compact can be obtained.

The lattice constant of the solid electrolyte obtained through the above-described steps exhibits specific changes in the temperature range around 400° C. as described above. Therefore, in the invention of the present application, the third heat treatment step of holding the above-described solid electrolyte sintered compact at a temperature lower than in the above-described sintering step for a predetermined time is carried out.

The above-described third heat treatment step is not particularly limited as long as characteristics which will not cause changes in lattice constant can be imparted to the above-described solid electrolyte sintered compact. For example, the above-described third heat treatment step can be carried out by holding at a temperature of 400° C. to 1000° C. (more than or equal to 400° C. and less than or equal to 1000° C.) for 5 hours to 30 hours (more than or equal to 5 hours and less than or equal to 30 hours).

By carrying out the above-described third heat treatment step, the lattice constant does not specifically change in the temperature range around 400° C., so that the rate of increase in lattice constant at 100° C. to 1000° C. with respect to temperature changes can be made substantially constant.

The above-described third heat treatment step can be carried out after cooling the above-described sintered compact to ordinary temperature after the above-described sintering step. Alternatively, the above-described sintering step and the above-described third heat treatment step can be carried out sequentially.

A solid electrolyte laminate is formed by carrying out an anode electrode material laminating step of laminating an anode electrode material on one side of the above-described solid electrolyte sintered compact having undergone the above-described third heat treatment step, a cathode electrode material laminating step of laminating a cathode electrode material on the other side of the above-described solid electrolyte layer, and an electrode material sintering step of heating a laminate in which the above-described electrode materials are formed to a predetermined temperature to sinter the above-described electrode layers.

In the solid electrolyte layer formed by the solid electrolyte layer forming step according to the invention of the present application, changes in lattice constant with respect to temperature changes are constant, and the coefficient of thermal expansion will not change depending on the temperature. Therefore, in the above-described electrode material sintering step, cracks in the above-described solid electrolyte layer and detachment of the electrode layers will not occur.

The above-described electrode materials are not particularly limited. For example, as the cathode electrode material, an electrode material such as platinum or LSM (lanthanum strontium manganite) can be employed. As the anode electrode material, an electrode material such as Ni—BZY (nickel-yttrium doped barium zirconate) can be employed.

A solid electrolyte laminate can be formed by laminating the above-described electrode materials on the surface of the solid electrolyte formed by the above-described manufacturing method and heating to a predetermined temperature for sintering.

In the above-described manufacturing method, the disc-like sintered compact constituting the solid electrolyte layer is first formed, and the electrode layers are laminated on this disc-like sintered compact serving as a support member, however, the manufacturing method is not limited to the above-described method.

For example, a technique for first forming a compact constituting the anode electrode, and successively laminating the above-described solid electrolyte layer and the above-described cathode electrode layer on this anode electrode compact serving as a support member can be employed.

The above-described anode electrode compact can be formed, for example, by an anode electrode material preparing step of mixing Ni with BZY synthesized from $BaCO_3$, $ZrO_2$, and $Y_2O_3$, and an anode electrode molding step of compression molding the above-described anode electrode material to form an anode electrode compact to be the anode electrode layer. Since the above-described anode electrode serves as a support member, its thickness is preferably set at approximately 1 mm.

The technique for laminating the solid electrolyte layer on the above-described anode electrode compact can be achieved as follows. That is, similarly to the above-described manufacturing method, the above-described first grinding step, the above-described first heat treatment step, the above-described second grinding step, the above-described first compression molding step, the above-described second heat treatment step, and the above-described third grinding step are carried out to form a ground product of BZY.

Next, a paste forming step of forming the above-described ground product into paste, and a solid electrolyte laminating step of laminating the above-described ground product formed into paste on one side of the above-described anode electrode compact are carried out. Since the above-described solid electrolyte laminate does not serve as a support member, its thickness can be set at 10 μm to 100 μm.

Then, an anode electrode-solid electrolyte sintering step of heat treating the laminate (first laminate) molded in the above-described solid electrolyte laminating step at a temperature of 1400° C. to 1600° C. for at least 20 hours in an oxygen atmosphere, and a third heat treatment step of holding the laminate having undergone the above-described anode electrode-solid electrolyte sintering step at a temperature lower than in the above-described anode electrode-solid electrolyte sintering step for a predetermined time are carried out.

A cathode electrode material laminating step of laminating a cathode electrode material made of lanthanum strontium cobalt oxide (LSC), lanthanum strontium cobalt iron oxide (LSCF) or the like on one side of a thin-film solid electrolyte having undergone the above-described third heat treatment step, and a cathode electrode sintering step of heating to or above a sintering temperature of the above-described cathode electrode material are carried out. It is noted that the cathode electrode material laminating step and the cathode electrode sintering step can be carried out similarly to the above-described method. Through these steps, the above-described solid electrolyte laminate can also be formed.

In the invention of the present application, since the above-described solid electrolyte layer has undergone the third heat treatment, the rate of increase in lattice constant with respect to temperature changes is constant in the temperature range of 100° C. to 1000° C., and accordingly, the coefficient of thermal expansion is also constant. It is therefore possible to sinter the solid electrolyte layer and the electrode layers without causing strain and the like. The solid electrolyte laminate can be formed without causing cracks in the solid electrolyte layer or detachment of the electrode layers. Moreover, since internal stress and the like can be restrained from occurring, a solid electrolyte laminate having high durability can be formed.

The solid electrolyte according to the invention of the present application is suitable for various types of fuel cells used in a temperature range less than or equal to 600° C., but can also be utilized for fuel cells used in a temperature range more than or equal to 600° C.

Advantageous Effects of Invention

Even when the doped amount of yttrium is set large in order to improve sinterability, a solid electrolyte made of yttrium-doped barium zirconate having constant rate of change in lattice constant and constant coefficient of thermal expansion and high proton conductivity can be provided.

DESCRIPTION OF EMBODIMENTS

Hereinafter, embodiments according to the invention of the present application will be described based on the drawings.

Figure 1:
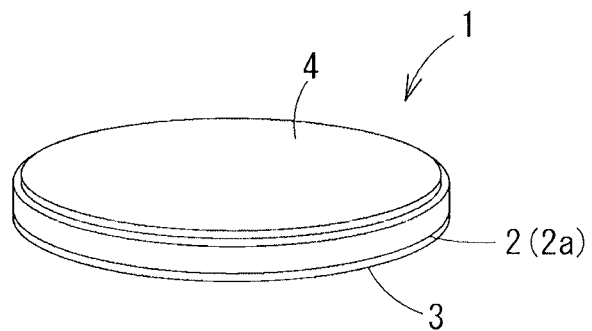
FIG. 1 is an overall perspective view showing an example of a solid electrolyte laminate according to the invention of the present application.
Figure 2:
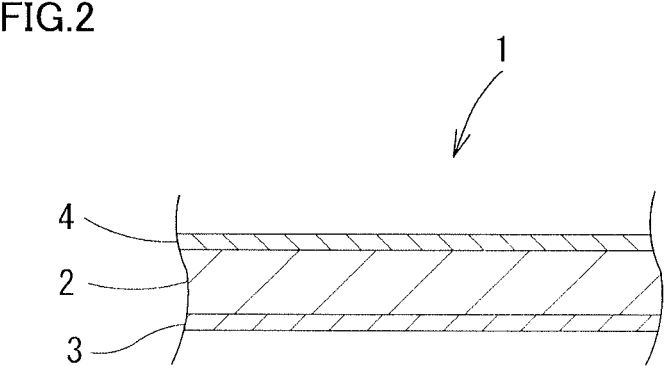
FIG. 2 is an enlarged sectional view of an essential part of the solid electrolyte laminate shown in FIG. 1.

As shown in FIG. 1, a solid electrolyte laminate 1 constituting a fuel cell is configured to include a solid electrolyte layer 2, an anode electrode layer 3 as a first electrode layer laminated on one side of this solid electrolyte layer 2, and a cathode electrode layer 4 as a second electrode layer formed on the other side.

As solid electrolyte layer 2 according to the present embodiment, a solid electrolyte 2a made of yttrium-doped barium zirconate (BZY) having hydrogen ion conductivity is employed. Above-described anode electrode layer 3 as the first electrode layer is formed by laminating and sintering proton conductive ceramics, and is configured to serve as an anode electrode. On the other hand, above-described cathode electrode layer 4 as the second electrode layer is formed by laminating and sintering platinum or ESM (lanthanum strontium manganite), and is configured to serve as a cathode electrode.

Besides the above-described electrode materials, an electrode material such as LSC, LSCF, LSM, or BSCF (barium strontium cobalt iron oxide) can be employed as the above-described cathode electrode material. On the other hand, Ni—BZY (nickel-yttrium doped barium zirconate), NiFe—BZY, Fe—BZY, or Ni—BCY ($BaCe_{0.8}Y_{0.2}O_{3-\delta}$) can be employed as the above-described anode electrode material.

Figure 8:
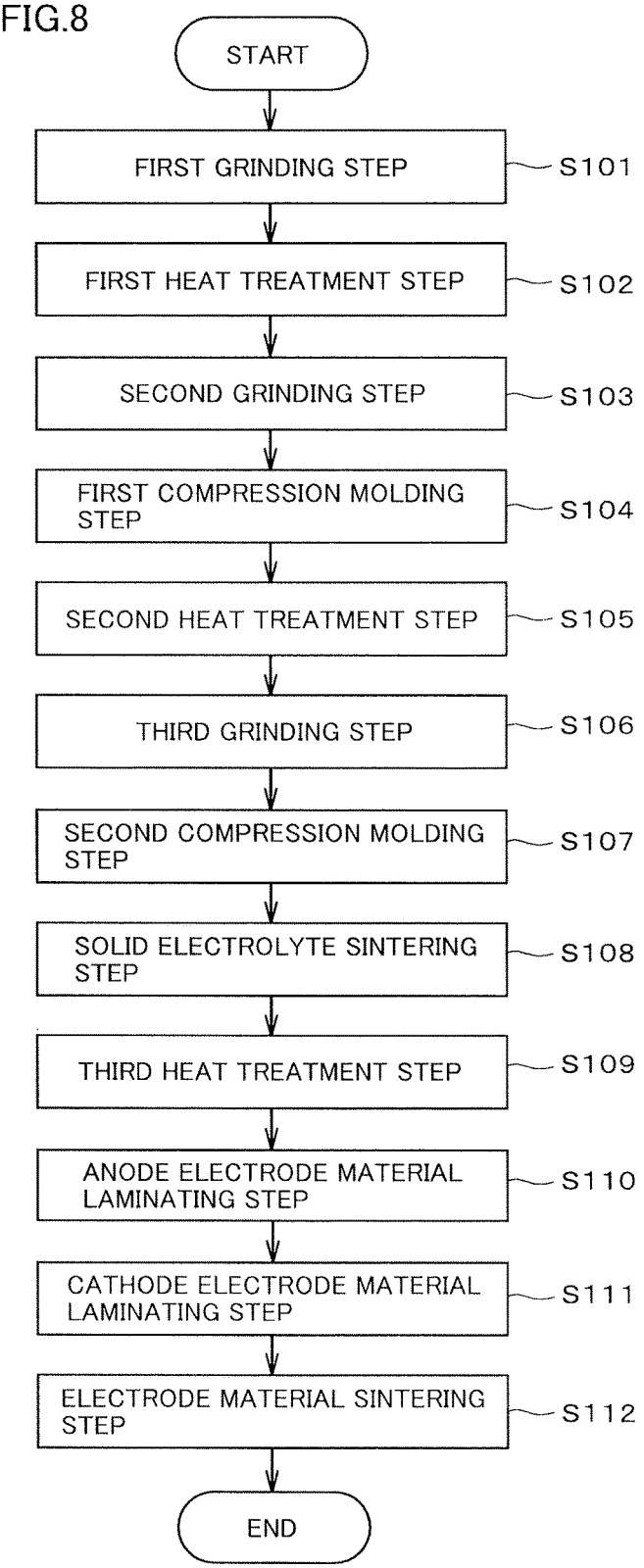
FIG. 8 is a flow chart showing an example of a manufacturing process of the solid electrolyte laminate according to the invention of the present application.

Hereinafter, a method for manufacturing solid electrolyte laminate 1 will be described. FIG. 8 shows a flow chart of a manufacturing process of the solid electrolyte laminate.

First, in order to form solid electrolyte layer 2 made of BZY having 20 mol % of yttrium doped thereto, 62 wt % of $BaCO_3$, 31 wt % of $ZrO_2$ and 7 wt % of $Y_2O_3$ as raw materials are mixed, and a first grinding step is carried out by ball milling to uniformly mix these raw materials. Thereafter, a first heat treatment step is carried out by heat treatment at 1000° C. for about 10 hours, and further, a second grinding step is carried out by performing ball milling on a powder material having undergone the above-described first heat treatment step. Although the degree of grinding of the materials in the above-described grinding steps is not particularly limited, but it is preferable to perform grinding such that the mean particle diameter of ground powder is less than or equal to 355 μm.

Next, a compression molding step of uniaxially molding the mixed powder having undergone the second grinding step to form a disc-like pressed compact is carried out. In the above-described compression molding step, for example, a cylindrical die having a diameter of 20 mm is used, and a compressive force of 10 MPa is applied in the axial direction, so that a disc-like compact can be formed.

A second heat treatment step of heat treating the above-described pressed compact at about 1300° C. for about 10 hours, thereby dissolving each component powder to uniformly dissolve each component in a dispersed manner is carried out. In solid electrolyte 2a according to the invention of the present application, in order to enable low-temperature operation, a uniform structure in which the above-described respective components have been uniformly dissolved in a dispersed manner needs to be formed. Therefore, a third grinding step of grinding the compact having undergone the above-described second heat treatment step is carried out. Furthermore, by repeatedly carrying out the above-described compression molding step, the above-described second heat treatment step and the above-described third grinding step in this order according to necessity, a material in which the respective components have been more uniformly dissolved in a dispersed manner can be formed. Whether the above-described respective component powders have been uniformly dissolved in a dispersed manner can be confirmed depending on whether component peak positions of a graph obtained by an X-ray diffractometer (XRD) are consisting of peaks derived from BZY.

Having terminated the above-described third grinding step, a second compression molding step of compression molding the ground material in which the respective components have been uniformly dissolved in a dispersed manner is carried out. The second compression molding step is to mold the above-described ground material into the form of above-described solid electrolyte layer 2, and a disc-like compact having a thickness of 100 μm to 500 μm can be formed by press molding, for example.

Figure 5:
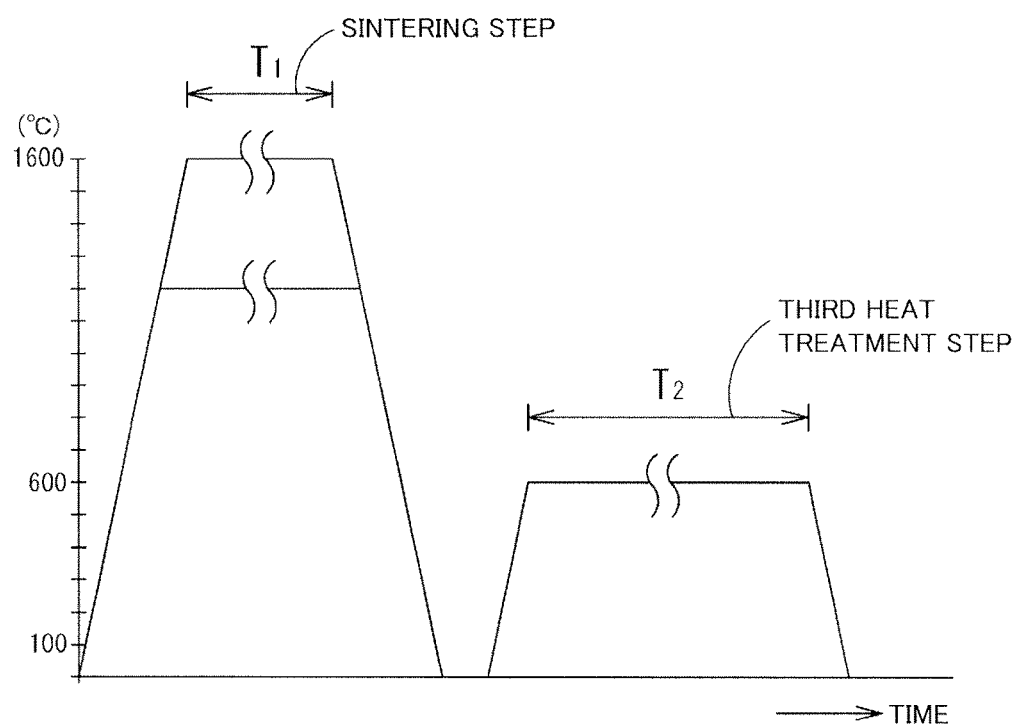
FIG. 5 shows a sintering step and a third heat treatment step according to the invention of the present application.

As shown in FIG. 5, the above-described compact is sintered by carrying out a sintering step of heat treating at a temperature of 1400° C. to 1600° C. for at least 20 hours ($T_1$) in an oxygen atmosphere, thereby obtaining a disc-like sintered compact constituting solid electrolyte layer 2 of the fuel cell.

Figure 3:
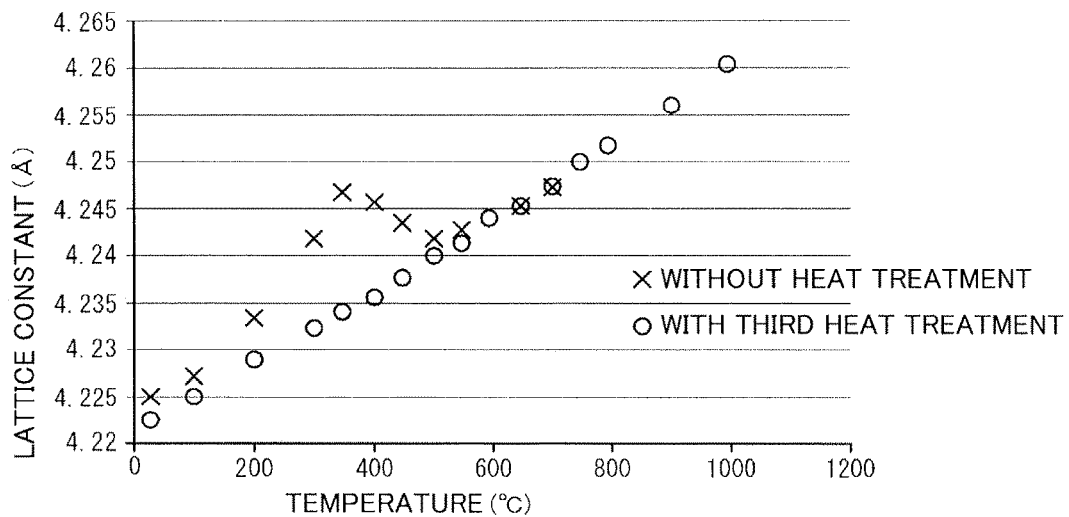
FIG. 3 shows changes in lattice constant of a solid electrolyte according to the invention of the present application having undergone a heat treatment and a solid electrolyte not having undergone a heat treatment, with respect to temperature changes.
Figure 4:
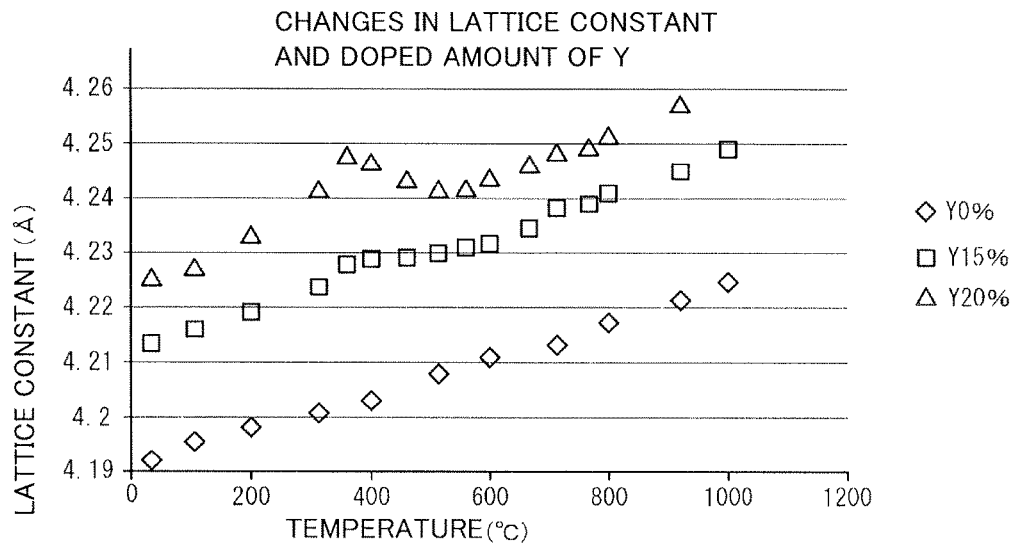
FIG. 4 shows changes in lattice constant of solid electrolytes having different amounts of yttrium doped, with respect to the temperature.

FIG. 3 is a graph showing changes in lattice constant of a solid electrolyte formed with 20 mol % of yttrium doped thereto, with respect to temperature changes. As shown in FIG. 3, the above-described solid electrolyte shows specific changes in lattice constant in the temperature range of 200° C. to 400° C., as plotted with the symbol "x". Resulting from the specific changes in lattice constant, the coefficient of thermal expansion also changes. Therefore, when laminating and sintering electrode layers 3 and 4 on the solid electrolyte manufactured through the above-described steps, large shearing stress is produced between solid electrolyte layer 2 and electrode layers 3, 4 because of the above-described changes in coefficient of thermal expansion, raising problems in that cracks occur in solid electrolyte layer 2 and in that electrode layers 3 and 4 are detached from solid electrolyte layer 2.

In the present embodiment, the third heat treatment step is carried out in order to solve the above-described problems. The above-described third heat treatment step can be carried out by holding the above-described disc-like solid electrolyte molded by sintering at a temperature of 400° C. to 1000° C. for $T_2=5$ hours to 30 hours, as shown in FIG. 5.

As plotted with the symbol "o" in FIG. 3, the lattice constant does not specifically change in a temperature range around 400° C. by carrying out the above-described third heat treatment step, so that the rate of increase in lattice constant at 100° C. to 1000° C. with respect to temperature changes can be made substantially constant.

Through electron microscopic observation, the mean diameter of crystal grains in the solid electrolyte having undergone the above-described third heat treatment step was 1 μm. Since crystal grains of the above-described size are obtained, high proton conductivity can be ensured without increase in grain boundary surface density. In the present embodiment, proton conductivity at 400° C. to 800° C. was 1 mS/cm to 60 mS/cm.

The lattice constant of above-described solid electrolyte 2a at room temperature was 4.223 Å. Because of having the above-described lattice constant, an appropriate doped amount of yttrium as well as absence of specific changes in lattice constant and coefficient of thermal expansion around 400° C. can be confirmed.

It is noted that, in the embodiment shown in FIG. 3, the rate of increase in lattice constant of the above-described solid electrolyte at 100° C. to 1000° C. with respect to temperature changes is approximately $3.8\times10^5$ Å/° C., but can be set at a range of $3.3\times10^{-5}$ Å/° C. to $4.3\times10^{-5}$ Å/° C. Accordingly, the average coefficient of thermal expansion at 100° C. to 1000° C. can be set at $5\times10^{-6}$(1/K) to $9.8\times10^{-6}$ (1/K).

Figure 6:
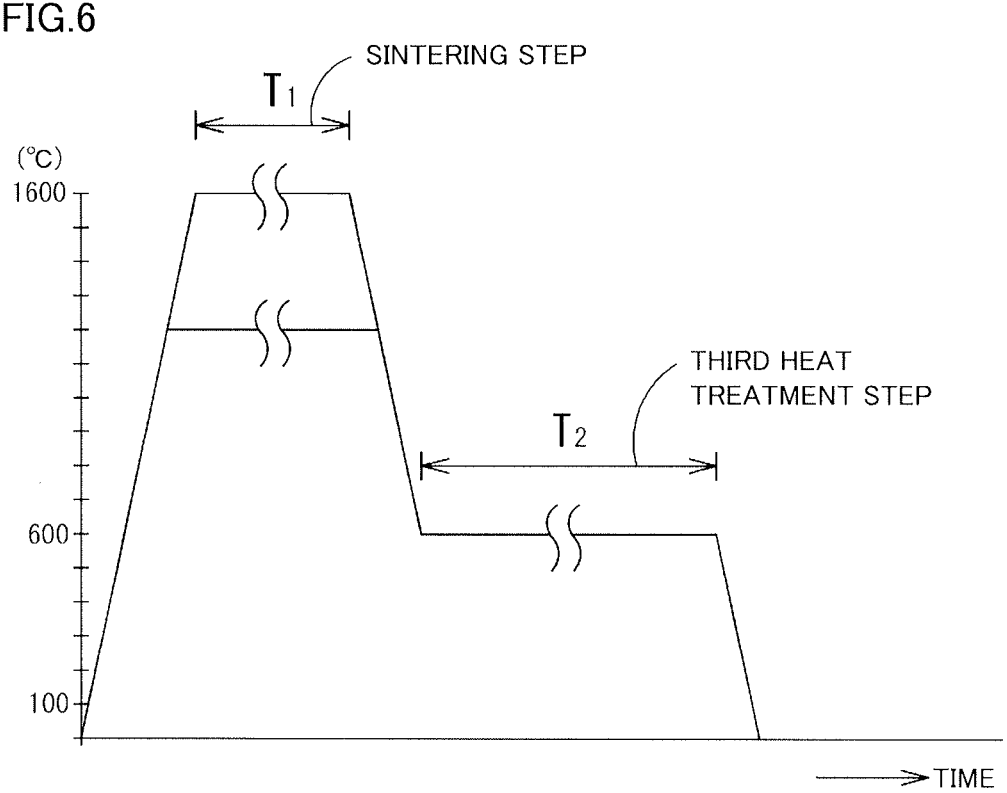
FIG. 6 shows a sintering step and a third heat treatment step according to a second embodiment of the invention of the present application.

It is noted that the above-described third heat treatment step can be carried out separately from the above-described sintering step as shown in FIG. 5. Alternatively, as shown in FIG. 6, the above-described sintering step and the above-described third heat treatment step can be carried out sequentially.

Anode electrode layer 3 is formed on one side of the disc-like solid electrolyte having undergone the third heat treatment step, and cathode electrode layer 4 is formed on the other side thereof.

In the present embodiment, Ni—BZY (nickel-yttrium doped barium zirconate) is employed as the anode electrode material constituting anode electrode layer 3. The amount of Ni blended in Ni—BZY can be set at 67 mol % to 92 mol % (in the case of mixing NiO and BZY, the amount of NiO blended can be set at 30 wt % to 70 wt %). It is noted that, for the above-described BZY, powder of the above-described solid electrolyte according to the present embodiment having undergone the third heat treatment is preferably employed. The anode electrode material laminating step can be carried out by grinding and mixing powder made of NiO and BZY with a ball mill and then dissolving it in a solvent to form a paste, and applying the paste to the other side of the above-described solid electrolyte sintered compact by screen printing or the like.

On the other hand, an electrode material made of Pt (platinum) or LSM (lanthanum strontium manganite: $La_{0.6}Sr_{0.4}MnO_x$) can be employed as the second electrode material.

By laminating the above-described electrode materials in predetermined thickness respectively on the front and rear of the disc-like solid electrolyte sintered compact formed by the above-described manufacturing method, and heating them to a predetermined temperature for sintering, a solid electrolyte laminate can be formed. For example, the above-described material constituting anode electrode layer 3 can be laminated in 50 μm, and the above-described material constituting cathode electrode layer 4 can be laminated in 50 μm. Thereafter, by heating to the sintering temperature of the materials constituting the above-described electrode layers and holding for a predetermined time, solid electrolyte laminate 1 with anode electrode layer 3 and cathode electrode layer 4 formed on the both sides of above-described solid electrolyte layer 2 can be formed. It is noted that the electrode material sintering step of sintering above-described anode electrode layer 3 and the electrode material sintering step of sintering cathode electrode layer 4 can be carried out simultaneously or can be carried out separately.

The temperature required for sintering above-described electrode layers 3 and 4 is approximately 1000° C. In the present embodiment, since the above-described solid electrolyte has undergone the third heat treatment, the rate of increase in lattice constant with respect to temperature changes is constant in the temperature range of 100° C. to 1000° C. The coefficient of thermal expansion is also constant in correspondence to the lattice constant. Therefore, when forming electrode layers 3 and 4 by sintering, shearing stress or strain will not be increased due to the above-described difference in coefficient of thermal expansion at the interfaces of solid electrolyte layer 2 with electrode layers 3 and 4. Therefore, a solid electrolyte laminate can be formed without occurrence of cracks in the solid electrolyte layer or detachment of the electrode layers. Since internal stress and the like are also prevented from occurring, a solid electrolyte laminate having high durability can be formed.

In the above-described embodiment, the disc-like sintered compact constituting solid electrolyte layer 2 is formed first, and then electrode layers 3 and 4 are laminated on this disc-like sintered compact serving as a support member, but the manufacturing method is not limited to the above-described method.

Figure 7:
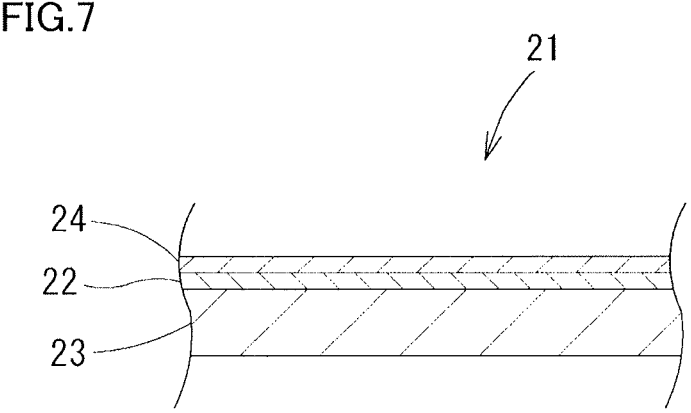
FIG. 7 is an enlarged sectional view showing an essential part of another embodiment of the solid electrolyte laminate according to the invention of the present application.
Figure 9:
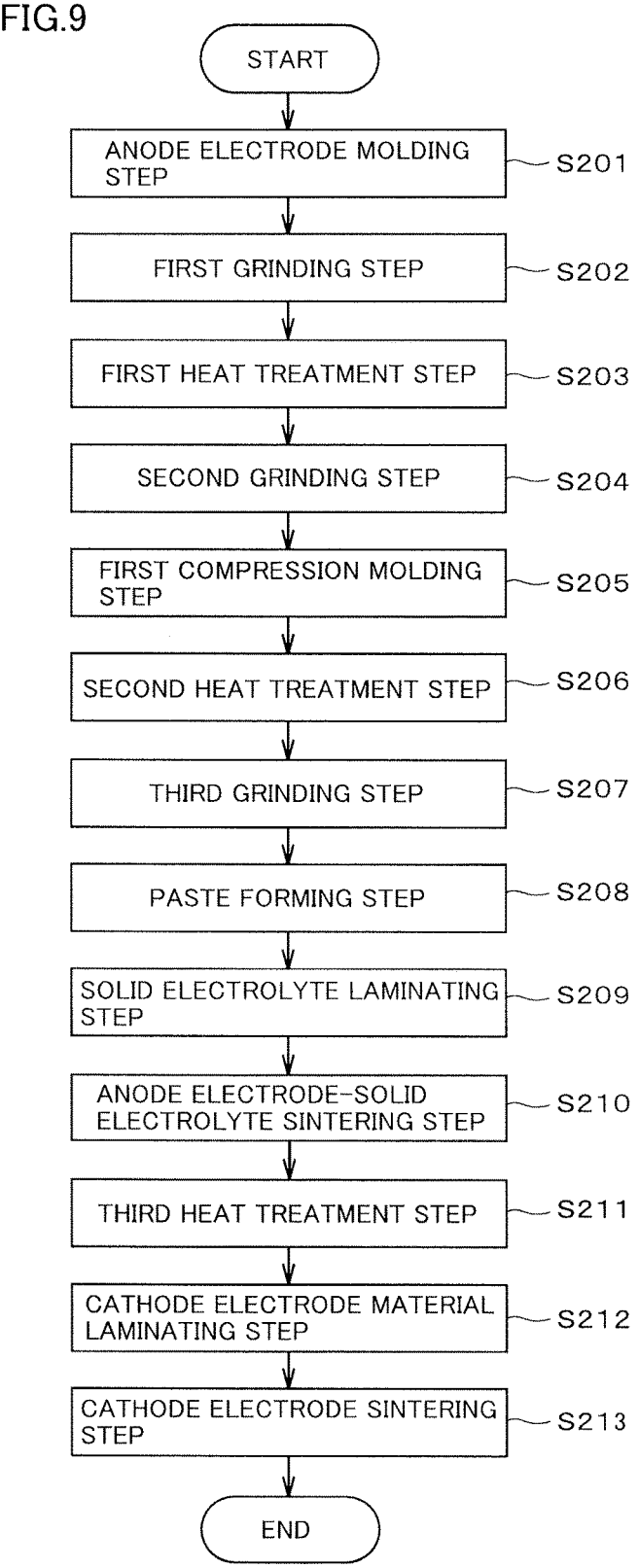
FIG. 9 is a flow chart showing another example of a manufacturing process of the solid electrolyte laminate according to the invention of the present application.

For example, a technique for first forming an anode electrode layer 23 shown in FIG. 7 and then successively laminating solid electrolyte layer 22 and cathode electrode layer 24 on this anode electrode layer 23 serving as a support member can be employed. FIG. 9 shows a flow chart of a manufacturing process of a solid electrolyte laminate formed by this technique.

An anode electrode compact to be above-described anode electrode layer 23 can be formed by, for example, an anode electrode material preparing step of mixing Ni with BZY synthesized from $BaCO_3$, $ZrO_2$, and $Y_2O_3$, and an anode electrode molding step of compression molding the above-described anode electrode material to form an anode electrode compact to be the anode electrode layer. In this manufacturing method, since the anode electrode compact (anode electrode layer 23) serves as a support member for solid electrolyte layer 22 and cathode electrode layer 24, the thickness of the anode electrode compact is set large. For example, it is preferably set at approximately 500 μm to 1 mm.

The technique for laminating the solid electrolyte layer on the above-described anode electrode compact can be carried out as follows. That is, the above-described first grinding step, the above-described first heat treatment step, the above-described second grinding step, the above-described first compression molding step, the above-described second heat treatment step, and the above-described third grinding step are carried out to form a ground product of BZY, similarly to the above-described manufacturing method.

Next, a paste forming step of forming the above-described ground product into paste and a solid electrolyte laminating step of laminating the above-described ground product formed into paste on one side of the above-described anode electrode compact are carried out. Since above-described solid electrolyte layer 22 does not serve as a support member in this embodiment, its thickness can be set as small as 10 μm to 100 μm. The above-described solid electrolyte laminating step can be carried out by screen printing or the like.

Then, an anode electrode-solid electrolyte sintering step of heat treating the laminate molded in the above-described solid electrolyte laminating step at a temperature of 1400° C. to 1600° C. for at least 20 hours in an oxygen atmosphere and a third heat treatment step of holding the laminate having undergone the above-described anode electrode-solid electrolyte sintering step for a predetermined time at a temperature lower than in the above-described anode electrode-solid electrolyte sintering step are carried out. Similarly to the first embodiment, the above-described anode electrode-solid electrolyte sintering step can be carried out by heat treatment at a temperature of 1400° C. to 1600° C. for at least 20 hours in an oxygen atmosphere. The above-described third heat treatment step can also be carried out by holding at a temperature of 400° C. to 1000° C. for 5 hours to 30 hours ($T_2$), similarly to the first embodiment.

A cathode electrode material laminating step of laminating, for example, the above-described cathode electrode material on one side of a thin-film solid electrolyte having undergone the above-described third heat treatment step and a cathode electrode sintering step of heating to or above the sintering temperature of the above-described cathode electrode material are carried out. The above-described cathode electrode sintering step can be carried out similarly to the above-described embodiment. Above-described solid electrolyte laminate 21 can also be formed through these steps.

As described above, above-described solid electrolyte 2a according to the present embodiment has a proton conductivity of 1 mS/cm to 60 mS/cm at 400° C. to 800° C. Therefore, even when a fuel cell including the above-described solid electrolyte laminate is used at a temperature less than or equal to 600° C., sufficient power generation capacity can be ensured. Moreover, since large internal stress and internal strain do not occur between the solid electrolyte layer and the electrode layers, the solid electrolyte laminate has high durability, and it is possible to constitute a fuel cell having sufficient performance.

The scope of the invention of the present application is not limited to the above-described embodiments. It should be understood that the embodiments disclosed herein are illustrative and non-restrictive in every respect. The scope of the present invention is defined by the claims not by the meaning above, and is intended to include any modification within the meaning and scope equivalent to the terms of the claims.

INDUSTRIAL APPLICABILITY

A solid electrolyte made of yttrium-doped barium zirconate that can be applied to a fuel cell operating at a temperature less than or equal to 600° C. because of its excellent sinterability and high proton conductivity can be provided.

REFERENCE SIGNS LIST 1, 21 solid electrolyte laminate; 2, 22 solid electrolyte layer; 2a solid electrolyte; 3, 23 anode electrode layer; 4, 24 cathode electrode layer.

The invention claimed is:
1. A solid electrolyte made of yttrium-doped barium zirconate having hydrogen ion conductivity,
a doped amount of yttrium being 15 mol % to 20 mol %, and a rate of increase in lattice constant at 100° C. to 1000° C. with respect to temperature changes being $3.3 \times 10^{-5}$ Å/° C. to $4.3 \times 10^{-5}$ Å/° C., and a rate of increase in lattice constant at 200° C. to 400° C. with respect to temperature changes being $3.3 \times 10^{-5}$ Å/° C. to $4.3 \times 10^{-5}$ Å/° C.,
wherein said yttrium-doped barium zirconate is a polycrystalline substance containing a plurality of crystal grains, and a mean diameter of said crystal grains is more than or equal to 1 μm.
2. The solid electrolyte according to claim 1, wherein the lattice constant at room temperature is 4.218 Å to 4.223 Å.
3. The solid electrolyte according to claim 1, wherein proton conductivity at 400° C. to 800° C. is 1 mS/cm to 60 mS/cm.
4. A fuel cell comprising the solid electrolyte as defined in claim 1.
5. A solid electrolyte laminate with electrode layers laminated on both sides of a solid electrolyte layer formed from the solid electrolyte as defined in claim 1.
6. A method for manufacturing the solid electrolyte laminate according to claim 5, comprising:
an anode electrode molding step of compression molding an anode electrode material to form an anode electrode compact to be an anode electrode layer;
a first grinding step of mixing and grinding $BaCO_3$, $ZrO_2$ and $Y_2O_3$ to obtain a first mixture;
a first heat treatment step of heat treating said first mixture;
a second grinding step of grinding the first mixture having undergone said first heat treatment step again to obtain a second mixture;
a first compression molding step of compression molding said second mixture to obtain a compact;
a second heat treatment step of heat treating said compact;
a third grinding step of grinding the compact having undergone said second heat treatment step to obtain a ground product;
a paste forming step of forming said ground product into paste to obtain paste;
a solid electrolyte laminating step of laminating said paste on one side of said anode electrode compact to obtain a first laminate including a thin-film solid electrolyte layer;
an anode electrode-solid electrolyte sintering step of heat treating said first laminate at a temperature of 1400° C. to 1600° C. for at least 20 hours in an oxygen atmosphere;
a third heat treatment step of holding the first laminate having undergone said anode electrode-solid electrolyte sintering step at a temperature lower than in said anode electrode-solid electrolyte sintering step;
a cathode electrode material laminating step of laminating a cathode electrode material on one side of the solid electrolyte layer included in the first laminate having undergone said third heat treatment step to obtain a second laminate; and
a cathode electrode sintering step of heating said second laminate to or above a sintering temperature of said cathode electrode material.
7. A method for manufacturing the solid electrolyte as defined in claim 1, comprising:
a first grinding step of mixing and grinding $BaCO_3$, $ZrO_2$ and $Y_2O_3$ to obtain a first mixture;
a first heat treatment step of heat treating said first mixture;
a second grinding step of grinding the first mixture having undergone said first heat treatment step again to obtain a second mixture;
a first compression molding step of compression molding said second mixture to obtain a first compact;
a second heat treatment step of heat treating said first compact;
a third grinding step of grinding the first compact having undergone said second heat treatment step to obtain a ground product;
a second compression molding step of compression molding said ground product to obtain a second compact;
a solid electrolyte sintering step of heat treating said second compact at a temperature of 1400° C. to 1600° C. for at least 20 hours in an oxygen atmosphere to obtain a sintered compact; and
a third heat treatment step of holding said sintered compact at a temperature lower than in said solid electrolyte sintering step.
8. The method for manufacturing the solid electrolyte according to claim 7, wherein said third heat treatment step is carried out by holding at a temperature of 400° C. to 1000° C. for 5 hours to 30 hours.
9. The method for manufacturing the solid electrolyte according to claim 7, wherein
said sintered compact is a thin film, and
said third heat treatment step is carried out after cooling said sintered compact to ordinary temperature.
10. The method for manufacturing the solid electrolyte according to claim 7, wherein said solid electrolyte sintering step and said third heat treatment step are carried out sequentially.
11. A method for manufacturing a solid electrolyte laminate including a solid electrolyte layer made of yttrium-doped barium zirconate having hydrogen ion conductivity and electrode layers provided on both sides of this solid electrolyte layer, the method comprising:
a solid electrolyte layer forming step of forming a thin-film solid electrolyte layer by the method for manufacturing the solid electrolyte as defined in claim 7;

an anode electrode material laminating step of laminating an anode electrode material on one side of said solid electrolyte layer;

a cathode electrode material laminating step of laminating a cathode electrode material on the other side of said solid electrolyte layer; and an electrode material sintering step of heating a laminate with the anode electrode material and the cathode electrode material formed therein to sinter the electrode materials.

* * * * *